US006489038B1

(12) United States Patent
Sperlich et al.

(10) Patent No.: US 6,489,038 B1
(45) Date of Patent: Dec. 3, 2002

(54) HEAT-LAMINABLE MULTI-LAYER FILM

(75) Inventors: Bernd Sperlich, Walsrode (DE); Willi Schwarz, Bomlitz (DE)

(73) Assignee: Wolff Walsrode Aktiengesellschaft, Walsrode (DE)

( * ) Notice: Subject to any disclaimer, the term of this patent is extended or adjusted under 35 U.S.C. 154(b) by 142 days.

(21) Appl. No.: 09/633,356

(22) Filed: Aug. 4, 2000

(30) Foreign Application Priority Data

Aug. 10, 1999 (DE) .......................... 199 37 773

(51) Int. Cl.[7] .................... B32B 27/28; B32B 27/32
(52) U.S. Cl. .................. 428/520; 156/327; 428/516
(58) Field of Search .................. 428/520, 522, 428/516; 156/327

(56) References Cited

U.S. PATENT DOCUMENTS

| 4,629,657 A | 12/1986 | Gulati et al. ............. 428/461 |
| 4,876,139 A | 10/1989 | Yamamoto et al. ......... 428/200 |
| 5,082,743 A | 1/1992 | Itamura et al. ........... 428/520 |
| 5,126,197 A | 6/1992 | Schinkel et al. .......... 428/349 |
| 6,074,715 A | * 6/2000 | Lind et al. ............... 405/157 |

FOREIGN PATENT DOCUMENTS

| DE | 37 44 214 | 7/1989 |
| JP | 53-4082 | 1/1978 |
| JP | 60-109834 | 6/1985 |

* cited by examiner

*Primary Examiner*—D. Lawrence
(74) *Attorney, Agent, or Firm*—Joseph C. Gil; James R. Franks; Aron Preis

(57) ABSTRACT

A multi-layered film that may be heat laminated to a substrate is described. The multi-layered film comprises a base layer comprising polypropylene, a first external layer comprising polypropylene, and a second external layer. The base layer is interposed between the first and second external layers. The second external layer comprises a mixture of first (i) and second (ii) ethylene vinyl acetate (EVA) copolymers, each having different vinyl acetate residue contents. The content of vinyl acetate residues in the first EVA copolymer (i) is 10 to 30 percent by weight, based on the weight of the first copolymer (i), the content of vinyl acetate residues in the second EVA copolymer (ii) is 1 to 10 percent by weight, based on the weight of the second copolymer (ii). The multi-layered film is heat laminated and oriented at least monoaxially.

10 Claims, No Drawings

HEAT-LAMINABLE MULTI-LAYER FILM

CROSS REFERENCE TO RELATED PATENT APPLICATION

The present patent application claims the right of priority under 35 U.S.C. §119(a)–(d) of German Patent Application No. 199 37 773.1, filed Aug. 10, 1999.

FIELD OF THE INVENTION

The present invention relates to heat-laminable and high-gloss multi-layer films, oriented at least monoaxially, with a heat-laminable layer for the production of a composite with various substrates, such as e.g. paper, cardboard, pasteboard articles, metal foils, plastic films, cloth webs, fabric nets.

BACKGROUND OF THE INVENTION

Multi-layer films of polyolefins possessing a stretched polypropylene layer and coated with various substances capable of hot melt adhesion, e.g. polyethylene, ethylene vinyl acetate or ionomers, are known e.g. from the Japanese published patent applications 60-109 834, 53-4082, U.S. Pat. No. 4,629,657 and EP-A-0 263 882. The known multi-layer films have various disadvantages, e.g. lack of interlayer adhesion, tendency of the laminated product to roll and, in particular, unsatisfactory optical properties. A further disadvantage is the tendency of the film to block on the roll, which has a negative effect on processability. EP 0 424 761 B1 describes a film with good interlayer adhesion and low tendency to block, but the optical properties of this film do not meet current requirements.

SUMMARY OF THE INVENTION

The object of the invention was to provide heat-laminable multi-layer films which do not have the disadvantages listed, in particular the unsatisfactory optical properties and the tendency to block on the roll, and are therefore suitable as laminating films, especially for high-gloss lamination.

Surprisingly, this was achieved by providing a film of the type mentioned at the beginning oriented at least monoaxially, which is characterised in that it contains a base layer I, which comprises polypropylene, an external layer II, which also comprises polypropylene, and an external layer III which can be heat-laminated by applying heat, characterised in that the layer III comprises an ethylene vinyl acetate copolymer A and an ethylene vinyl acetate copolymer B and these two ethylene vinyl acetate copolymers have different vinyl acetate contents

DETAILED DESCRIPTION OF THE INVENTION

The base layer I comprises polypropylene in a major amount. An isotactic polypropylene with a density of 0.90 to 0.91 g/cm$^3$ and a melt flow index of 1 to 4 g/10 min at 230° C./21.6 N (according to DIN 53.735) is preferably used. The base layer I can also contain lubricants and antistatic additives.

Suitable lubricants include are higher aliphatic acid amides, higher aliphatic acid esters, waxes and metallic soaps as well as polydimethyl siloxanes. The effective quantity of lubricant is in the range of 0.01 to 3 wt. %, preferably 0.02 to 1 wt. %. The addition of higher aliphatic acid amides in the range of 0.01 to 0.25 wt. % is particularly suitable. An especially suitable aliphatic acid amide is erucamide.

Preferred antistatic additives are alkali-alkane sulfonates, polyether-modified, i.e. ethoxylated and/or propoxylated polydiorganosiloxanes (polydialkyl siloxanes, polyalkylphenyl siloxanes etc.) and/or the substantially straight-chain and saturated aliphatic, tertiary amines with an aliphatic radical with 10 to 20 carbon atoms which are substituted with ω-hydroxy-($C_1$–$C_4$)-alkyl groups, N,N-bis(2-hydroxyethyl)alkylamines with 10 to 20 carbon atoms, preferably 12 to 18 carbon atoms, in the alkyl radical being particularly suitable. The effective quantity of antistatic agent is in the range of 0.05 to 0.5 wt. %. Glycerol monostearate is also suitable and is used as antistatic agent in a quantity of 0.03% to 0.5 wt. %.

The external layer II also consists substantially of polypropylene. An isotactic polypropylene with a density of 0.90 to 0.91 g/cm$^3$ and a melt flow index of 1 to 10 g/10 min at 230° C./21.6 N (according to DIN 53 735) is preferably used. The external layer II preferably contains 0.02 to 1.0% anti-blocking agent, particularly preferably 0.05 to 0.2%. Suitable anti-blocking agents are inorganic additives such as silicon dioxide, calcium carbonate, magnesium silicate, aluminium silicate, calcium phosphate etc. and/or incompatible organic polymers such as polyamides, polyacrylates, polymethacrylates, polyesters, polycarbonates etc., silicon dioxide preferably being used. The content of anti-blocking agent is in the range of 0.05 to 1 wt. %, preferably 0.1 to 0.3 wt. %. The average particle size is between 1 and 6 μm, especially 2 and 5 μm.

In a preferred embodiment the ethylene vinyl acetate copolymer A has a vinyl acetate content of 10 to 30% and the ethylene vinyl acetate copolymer B has a vinyl acetate content of 1 to 10%. In a particularly preferred embodiment the ethylene vinyl acetate copolymer A has a content of polymerised vinyl acetate units of 15 to 25 wt. % and the ethylene vinyl acetate copolymer B has a content of polymerised vinyl acetate units of 3 to 7 wt. %. In a preferred embodiment, the proportion of the ethylene vinyl acetate copolymer A in the external layer III is 60 to 95% and the proportion of the ethylene vinyl acetate copolymer B in the external layer III is 5 to 40%. In a particularly preferred embodiment, the proportion of the ethylene vinyl acetate copolymer A in the external layer III is 70 to 90% and the proportion of the ethylene vinyl acetate copolymer B in the external layer III is 10 to 30%.

The MFI values of the two ethylene vinyl acetate copolymers A and B are preferably between 1 and 30 g/10 min (ASTM D 1238). The MFI of the ethylene vinyl acetate copolymer A is particularly preferably between 10 and 30 g/10 min (ASTM D 1238) and the MFI of the ethylene vinyl acetate copolymer B is particularly preferably between 4 and 15 g/10 min (ASTM D 1238).

The multi-layer films according to the invention are particularly suitable as high-gloss laminating films for the production of paper and cardboard composites and for the surface finishing of graphic products such as books, CD and brochure covers, which can also be embossed.

The multi-layer films according to the invention can be produced by conventional methods such as lamination, coating, melt extrusion or melt coextrusion. In a preferred embodiment the base layer I and the external layer II are coextruded and stretched in one direction, lamination or extrusion of the heat-laminable layer III taking place after the stretching. The multi-layer film obtained in this way is then stretched again, preferably in the direction in which no stretching has yet been applied.

The multi-layer films according to the invention are stretched at least monoaxially, preferably biaxially, the stretching preferably taking place in a ratio of 5:1 to 7:1 in the machine direction and in a ratio of 7:1 to 10:1 transverse to the machine direction.

In the multi-layer films according to the invention the base layer I generally has a thickness of 8 to 50 μm, preferably 12 to 20 μm, the external layer II preferably a thickness of 0.6 to 3.0 μm and the heat-laminable external layer III generally has a thickness of 5 to 20 μm, preferably 7 to 15 μm.

The films according to the invention can be subjected to a corona pre-treatment on one or both sides.

The present invention also provides a process for the production of composites from any substrates and a film according to the invention, characterised in that the substrate and the film are brought together under the action of heat and pressure, with the heat-laminable external layer III facing the substrate. The substrates are preferably materials which are conventionally used for high-gloss laminating, such as e.g. paper, cardboard, plastic, metal, wood, woven and nonwoven fabrics, vegetable products, but also films and foils, especially plastic films or metal foils.

Test Methods
Unwinding Behaviour

The unwinding behaviour was investigated on a finished roll sample. The film was wound in a flat width of approx. 250 mm to a length of 20 m. This gave a roll weight, including the rewinding tube, of approx. 1.5 kg. The unwinding properties were divided into the following categories:

1. Unwinding by the roll's own weight (+):
If the loose end of the roll sample is fixed and the sample is allowed to hang, the finished film unrolls through the force of its own weight.
2. Unwinding possible by additional pulling (o):
Although unrolling by the roll's own weight is not possible, the film can nevertheless be unwound without being over-stretched or torn off.
3. Roll blocks (−):
It is impossible to unroll the film without severely deforming it or destroying it.

Interlayer Adhesion:

The interlayer adhesion of the films was investigated in a laminating test. For this purpose, the films to be investigated were laminated with a sheet of paper printed in black on a heat laminating machine from Billhöfer. The process conditions selected for this test were a laminating temperature of approx. 120° C., a laminating cylinder pressure of 150 bar and a laminating rate of 5 m/min. Test strips with a width of 15 mm were cut from these finished samples in the machine direction. The interlayer adhesion was measured on these strips by pulling at an angle of 90° and recording the pulling force.

Gloss:

To measure the gloss, a laminated sample with a sheet of paper printed in black was produced as for determining the interlayer adhesion. The gloss measurement was carried out on this sample based on DIN 67 530 with a 20° angle. Gloss is defined as the portion of light regularly reflected, based on a beam of light shining in at an angle of 20° to vertical. The gloss is given in gloss units (GU) which are based on a black glass standard. The value of the surface gloss should be as high as possible.

EXAMPLES

Example 1

A heat-laminable layer III with the components given in table 1 is applied to a monoaxially stretched base film made of polypropylene with a density of 0.91 g/cm$^3$ and a melt flow index of 3.0 g/10 min at 230° C./21.6 N and then stretched, so that a composite film is obtained with longitudinal stretching in a ratio of 5:1 and transverse stretching in a ratio of 10:1.

The base film is composed of an external layer II, 1.0 μm thick, consisting of polypropylene with a density of 0.91 g/cm$^3$ and a melt flow index of 3.0 g/10 min at 230° C./21.6 N and an addition of 0.1% silicon dioxide with an average particle size of 4 μm, and a core layer I of the above polypropylene. The film, which is composed of layers I and II, has a total thickness of 15 μm and the heat-laminable layer III a thickness of 10 μm.

Example 2

Method and composition of layers I and III as in example 1. The external layer II contains no anti-blocking additive.

Comparative Examples 3–5

Method and composition of layers I and II as in example I (external layer II with 0.1% silicon dioxide as anti-blocking additive). The composition of the heat-laminable external layer III can be seen from table 1.

TABLE 1

Composition of the heat-laminable external layer III

| Example | Copolymer A | Copolymer B |
| --- | --- | --- |
| Example 1 | 80% ethylene vinyl acetate copolymer with 20% structural units derived from vinyl acetate (MFI = 20 g/10 min (ASTM D 1238); density: 0.940 g/cm$^3$) | 20% ethylene vinyl acetate copolymer with 5% structural units derived from vinyl acetate (MFI = 7.5 g/10 min (ASTM D 1238); density: 0.925 g/cm$^3$) |
| Example 2 | as example 1 | as example 1 |
| Comparative example 3 | as example 1 | 20% LDPE (MFI = 7.5 g/10 min (ASTM D 1238); density: 0.9155 g/cm$^3$) |
| Comparative example 4 | as example 1 | 20% ethylene acrylic acid copolymer with 11% structural units derived from acrylic acid (MFI = 8.0 g/10 min (ASTM D 1238); density: 0.940 g/cm$^3$) |
| Comparative example 5 | 100% ethylene vinyl acetate copolymer with 20% structural units derived from vinyl acetate (MFI = 20 g/10 min (ASTM D 1238); density: 0.940 g/cm$^3$) | — |

TABLE 2

| Example | Unwinding behaviour | Interlayer adhesion in N | Gloss in GU |
| --- | --- | --- | --- |
| Example 1 | + | 3.5 | 75 |
| Example 2 | 0 | 3.4 | 78 |
| Comparative example 3 | + | 1.0 | 73 |
| Comparative example 4 | + | 3.3 | 62 |
| Comparative example 5 | − | 3.7 | 77 |

It can be seen from table 2 that the films according to the invention from examples 1 and 2 display clear improvements compared with the comparative examples in terms of their unwinding behaviour, interlayer adhesion and gloss. While it is true that comparative example 3 has acceptable values for unwinding behaviour and gloss, its interlayer adhesion is, however, inadequate. In the case of comparative example 4, the gloss does not meet current requirements and in comparative example 5 the film blocks and cannot be unwound.

What is claimed is:

1. A multi-layered film comprising a base layer comprising polypropylene, a first external layer comprising polypropylene, and a second external layer comprising a mixture of:

(i) a first ethylene vinyl acetate copolymer containing residues of vinyl acetate; and (ii) a second ethylene vinyl acetate copolymer containing residues of vinyl acetate, wherein the content of vinyl acetate residues in said first ethylene vinyl acetate copolymer (i) is 10 to 30 percent by weight, relative to the weight of said first copolymer (i), the content of vinyl acetate residues in said second ethylene vinyl acetate copolymer (ii) is 1 to 10 percent by weight, relative to the weight of said second copolymer (ii), and said multi-layered film being heat laminated and oriented at least monoaxially.

2. The multi-layered film of claim 1 wherein the content of vinyl acetate residues in said first ethylene vinyl acetate copolymer (i) is 15 to 25 percent, relative to the weight of said first copolymer (i), and the content of vinyl acetate residues in said second ethylene vinyl acetate copolymer (ii) is 3 to 7 percent, relative to the weight of said second copolymer (ii).

3. The multi-layered film of claim 1 wherein said mixture contains 60 to 95 percent of said first copolymer (i), and 5 to 40 percent of said second copolymer (ii), said percents, both occurrences being relative to the weight of said mixture.

4. The multi-layered film of claim 1 wherein said mixture contains 70 to 90 percent of said first copolymer (i), and 10 to 30 percent of said second copolymer (ii), said percents, both occurrences being relative to the weight of said mixture.

5. The multi-layered film of claim 1 wherein said first external layer contains at least one anti-blocking additive.

6. The multi-layered film of claim 5 wherein anti-blocking additive is present in an amount of 0.02 and 1.0% relative to the weight of said first external layer.

7. The multi-layered film of claim 5 wherein anti-blocking additive is present in an amount of 0.05 and 0.2% relative to the weight of said first external layer.

8. The multi-layered film of claim 5 wherein anti-blocking additive is silicon dioxide having an average particle size of 2 to 5 $\mu$m.

9. A process for the production of a composite comprising adheringly applying under pressure and heat the multi-layered film of claim 1 to a substrate wherein said second external layer faces said substrate.

10. The process of claim 9 wherein substrate is a member selected from the group consisting of paper, cardboard, plastic, metal, wood, woven fabric, non-woven fabric, vegetable product and net.

* * * * *